United States Patent [19]
Le Pabic

[11] 3,937,935
[45] Feb. 10, 1976

[54] FAULT DETECTION PROCESS AND SYSTEM FOR A TIME-DIVISION SWITCHING NETWORK

[75] Inventor: Jean Pierre Le Pabic, Jean Pierre, Paris, France

[73] Assignee: International Standard Electric Corporation, New York, N.Y.

[22] Filed: Nov. 6, 1974

[21] Appl. No.: 521,316

[30] Foreign Application Priority Data
Nov. 27, 1973 France .............................. 73.42091

[52] U.S. Cl. .......................... 235/153 AK; 179/18 J
[51] Int. Cl.² ........................................ G06F 11/00
[58] Field of Search ..... 235/153 A, 153 R, 153 AK; 340/146.1 R, 175.2 R, 175.2 C, 172.5; 179/18 J

[56] References Cited
UNITED STATES PATENTS

| | | | |
|---|---|---|---|
| 3,403,229 | 9/1968 | Piereth | 179/18 J |
| 3,449,520 | 6/1969 | Hoschler et al. | 179/18 J |
| 3,673,340 | 6/1972 | Casella et al. | 179/18 J |
| 3,689,701 | 9/1972 | Vosonnet et al. | 179/18 J |
| 3,755,789 | 8/1973 | Collins | 340/172.5 |
| 3,760,116 | 9/1973 | O'Toole | 179/18 J |

*Primary Examiner*—Charles E. Atkinson
*Attorney, Agent, or Firm*—John T. O'Halloran; Menotti J. Lombardi, Jr.; Alfred C. Hill

[57] ABSTRACT

A fault detection process and system is disclosed for large multistage time division-space division-time division switching networks. In the input time-division switch an origin bit is simultaneously transmitted with each sample to the related output channel of the output time division switch. The origin bit is produced by modulating a selected bit of the input channel address by an associated sample parity bit. In the output switch the modulated origin bit is demodulated by the received sample parity bit. This demodulated origin bit is compared with the corresponding bit of the input channel address which has been stored in a memory of the output switch under control of the network computer unit. In addition, means are provided for taking into account input delay, transmission delay and output delay.

11 Claims, 7 Drawing Figures

X = ANY BINARY VALUE 3,937,935

FAULT DETECTION PROCESS AND SYSTEM FOR A TIME-DIVISION SWITCHING NETWORK

BACKGROUND OF THE INVENTION

The present invention relates to a fault detection process and a fault detection system for a time-division switching network and more particularly for large sized networks combining both time-division and space-division switching stages.

Due to the complexity of switching operations in large multistage time-division switching networks various quasi-systematic tests must be made and particularly communication paths must be tested as well as transmission of communication signals. Such tests necessarily are very numerous in large time-division switching networks due to the great number of possible connections and the great number of resulting switching operations since transmission of each sample belonging to a communication involves a series of prior switching operations for establishing a path for the sample through the network.

Processes and systems making it possible to test the good transmission of samples through a time-division switching network are already known. Processes and systems make it possible to test arrivals of selected samples at their destinations. However, those processes and systems generally are fragmental and are not necessarily compatible with each other without modification. Moreover, often these processes and systems are designed for a predetermined configuration of the switching network.

SUMMARY OF THE INVENTION

Therefore, an object of the present invention is to provide a process for detecting either switching faults or transmission faults or both in any time-division switching network by means of only a unique set of operations.

Another object of this invention is to provide a fault detection system carrying out the previously mentioned process, such a system being compatible with various network configurations, but being particularly fitted to a switching network of which the central portion has a TST (time division-space division-time division) configuration.

According to a feature of this invention there is provided a fault detection process for detecting faults occurring in a time-division switching network comprising the steps of inserting partial origin coded data into the switching network together with coded samples from an input time-division channel so that the address of the input time-division channel can be determined from the partial origin coded data; storing the address of the time-division channel connected to an output time-division channel for the duration of a communication; and comparing the address of the input time-division channel produced from the partial origin coded data received from an output of the switching network together with associated ones of the coded samples transmitted to the output time-division channel with the stored address related to the input time-division channel connected to the output time-division channel to signal a fault upon the occurrence of any difference between the produced address and the stored address.

According to another feature of this invention the partial origin coded data associated with a sample is produced by the step of modulating a selected one of the address bits of the address of the input time-division channel delivering the coded sample by the parity of the coded sample before inserting the partial origin coded data into the switching network; and the produced address is produced by the step of demodulating the partial origin coded data associated with the coded samples according to the parity of the coded samples delivered from the output of the switching network.

According to another feature of this invention there is provided a fault detection system for a time-division switching network comprising: first means for producing a partial origin coded data associated with each coded sample delivered by various input time-division channels of the switching network; second means coupled to the first means to insert into the switching network the partial origin coded data together with its associated one of the coded samples; a switching network output coupled to the second means; the network output having various output time-division channels; third means coupled to the network output for separating the partial origin coded data from its associated one of the coded samples; fourth means coupled to the third means to determine bit by bit the address of that one of the input time-division channels delivering the coded sample received in one of the output time-division channels from the partial origin coded data associated with the coded sample received in the one of the output time-division channels; a switching network control computer unit; memory means coupled to the computer unit to store the address of the one of the input time-division channels as supplied by the computer unit; fifth means coupled to the memory means and the fourth means to determine transmission delays in the switching network affecting the coded sample and its associated one of the partial origin coded data in the one of the output time-division channels; sixth means coupled to the fifth means and the memory means to select a stored address bit as a function of the delays; seventh means coupled to the memory means and the fourth means to compare a bit of the received partial origin coded data with the selected stored address bit; and fault signalling means coupled to the computer unit and the seventh means responsive to differences detected by the comparison so as to inform the computer unit accordingly.

According to another feature of this invention the above-mentioned fifth means includes at least a selected one of eight means coupled to the computer unit, the memory means and the fourth means to detect transmission delay introduced by a space-division switch of the switching network through which, for the duration of a communication, the coded samples and their associated ones of the partial origin coded data are transmitted, the eight means being controlled by the computer unit, ninth means coupled to the computer unit, the memory means and the fourth means to detect transmission delay introduced by an output time-division switch of the switching network through which, for the duration of a communication, the coded samples and their associated ones of the partial origin coded data are transmitted, the ninth means being controlled by the computer unit, and tenth means coupled to a network control unit, the memory means and the fourth means to detect random transmission delays introduced in successive superframes by an input time-division switch of the switching network through which the coded samples and their associated partial origin coded data are transmitted to an output time-division channel, the tenth means being operated at the beginning of every superframe by the control unit and stores the value of the current delay of the coded samples and their associated partial origin coded data received in the output time-division channel.

It must be understood that according to the network configuration all of the immediately above-mentioned means are not compulsory. For instance, in the hereafter described embodiment for a TST network the delay introduced by the intermediate space-division portion of the network is negligible and the corresponding fault detection system does not include the first means.

The fault detection system according to this invention may be employed with a network comprising only a time-division-stage with either the second means utilized if the delay introduced by this stage is fixed for the duration of the communication or the determining means utilized if such a delay is not fixed.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
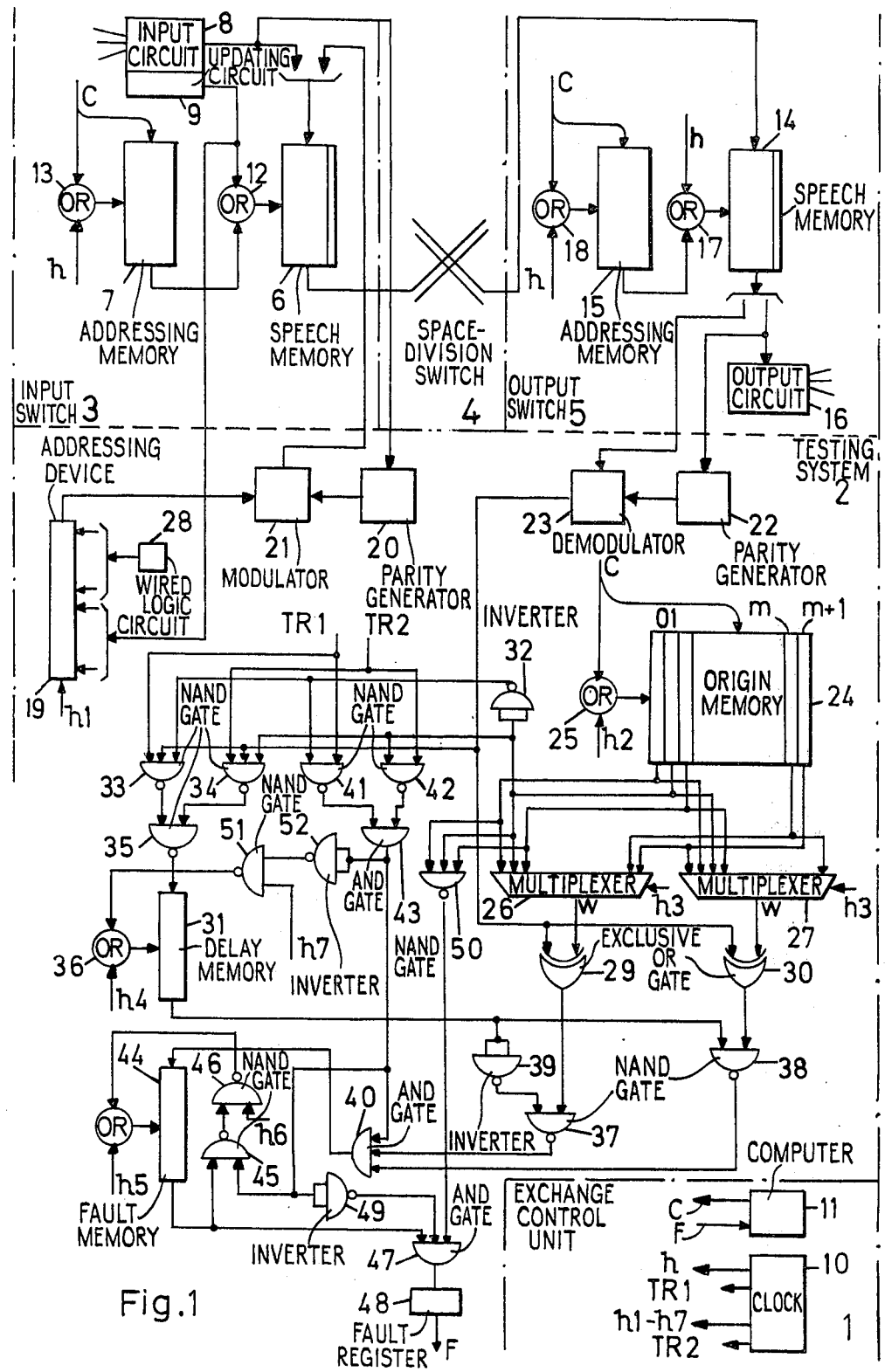
FIG. 1 is a block diagram of a time-division switching network provided with a fault detection in accordance with the principles of this invention.

FIG. 1 shows a TST time-division switching network utilized in an exchange, together with the exchange control unit 1 and the test system 2 according to the principles of the present invention.

The switching network basically comprises an input stage including $n$ input time-division switches identical to switch 3, an output stage preferably also comprising $n$ output time-division switches identical to switch 5, and a space-division switch 4 connected from input time-division switches to output time-division switches. Space-division switch 4 may include one or more stages so arranged as to insure a correct service between input and output time-division stages according to processes well known to people skilled in the art.

Conventionally input time-division switch 3 comprises a speech memory 6, an addressing memory 7 and a switching interface including an input circuit 8 and updating circuit 9.

Input circuit 8 receives any speech samples delivered by one of the $p$ channels of one of the $q$ input junctions which are connected to input circuit 8 in a manner not shown. Each sample is received in series and transmitted in parallel after multiplexing from circuit 8 to speech memory 6.

In input circuit 8 updating circuit 9 provides updating of input samples with respect to the switching network clock 10 to which it is connected in a manner not shown.

Logic circuitry of updating circuit 9 also provides the address at which each sample must be stored in speech memory 6. In the described embodiment that address comprises $r$ bits assuming preferably that there is a relation $2^r = p.q$.

Time-division addressing memory 7 provides addressing for reading speech memory 6. Memory 7 is loaded and addressed in write operation by computer 11 controlling the switching network and in read operation by network clock 10 (signal $h$).

Any sample from speech memory 6 is transmitted to an output time-division switch via switching network space-division switch 4, for example, to switch 5, or more precisely to speech memory 14 in switch 5. Conventionally switch 5 comprises a time-division addressing memory 15 and an output circuit 16 in addition to memory 14.

Speech memory 14 provides time-division switching for output samples. It is addressed in write operation by addressing memory 15 and in read operation by network clock 10. Output circuit 16 converts each sample received in parallel from speech memory 14 into series form so as to make the transmission of that sample possible via one of the time-division channel of the output junction connected thereto, those outgoing junctions not being shown.

It must be understood that the operation of the other input time-division switches 3 and output time-division switches 5 are identical to the above-mentioned operation and in particular those switches are synchronized by the same clock signal as the described switches 3 and 5.

According to this invention the test system 2 is provided for associating origin data to each sample transmitted through the network, origin data being the address of the input time-division channel delivering the considered sample.

It must also be understood that origin data may be transmitted either via the same path as the sample which it is associated with, or via a path physically distinct of the sample path, which may correspond either to a serial transmission on the same physical medium, or a parallel transmission on different mediums either passing through the same circuits or through different physical mediums having only their inputs and their outputs associated. In the described embodiment, there will be utilized parallel physical mediums passing through the same circuits, a sample and origin data associated thereto being transmitted through the same time-division switches and the same cross-points.

Moreover, with $n$ input time-division switches, each being connected to $q$ junctions each comprising $p$ input time-division channels, and consequently $n.p.q.$ input time-division channels, each input time-division channel address comprises at least $m$ bits preferably with $2^m = n.p.q$.

As usually $m$ is a large number of bits and it is not practical to transmit $m$ bits in parallel with each sample through the switching network.

Therefore, according to this invention, the $m$ channel address bits are associated one by one with $m$ samples delivered from the same channel during $m$ successive or quasi-successive frames. Thus, it is sufficient to known what is the present frame when sending the first bit of an address and what are the $m$ bits received during that frame and the following ones for determining the origin of samples delivered from a network output toward an output time-division channel.

Due to possible failures in the network, a bit transmitted with a sample or one of the $v$ sample bits may be changed during the transmission through the network.

According to this invention, for detecting any change of that type and any dissociation of the information "sample plus associated bit", each origin data bit is modulated by the parity of the associated sample as soon as it enters the network.

Therefore, test system 2 comprises an arrangement associated with each input time-division switch for implementing two operations. Arrangements of the various input time-division switches are identical to the arrangement associated with switch 3, which comprises an addressing device 19, a parity generator 20 and a modulator 21.

Addressing device 19 is delivering the pq addresses of input time-division channels in switch 3 at a rate of one address bit per frame for each channel and obviously at most one address bit per elementary time.

Each input time-division channel address comprises $r$ bits corresponding to the channel address in switch 3 which the channel is connected to and of $s$ bits corresponding to the address of switch 3 in the network among the $n$ switches 3.

In a known manner, updating circuit 9 of switch 3 delivers the cell address in speech memory 6 at which a sample from the output of input circuit 8 must be stored. As a principle every sample from the same channel is always stored at the same address in each memory. Therefore the address of the speech memory cell assigned to an input time-division channel may be considered as the address of that channel in the input switch which it is connected to. Consequently, in the described embodiment addressing device 19 is connected to the $r$ outputs of updating circuit 9 which address speech memory 6 and, thus, enables device 19 to know the channel address delivered from circuit 9 with each sample.

The $s$ bits of the input time-division address which correspond to the address of switch 3 are identical for the $pq$ channels connected to that switch and are thus delivered from addressing device 19 in a fixed manner, for example, by means of a wired logic circuitry 28.

Addressing device 19 is synchronized by h1 from clock 10. Thus, at each elementary time addressing device 19 delivers a bit either received from wired logic circuitry 28 associated with switch 3, or from updating circuit 9 depending on the rank of the current frame at that time within the superframe containing the current frame.

Parity generator 20 delivers parity bits of samples as soon as samples are delivered from input circuit 8.

A sample parity bit is transmitted from generator 20 to modulator 21 which also receives the bits delivered from addressing device 19, such a received bit then being modulated by the sample parity bit of the sample which it will be associated with during transmission through the switching network. In a preferred embodiment, modulator 21 is an exclusive OR gate.

In the described embodiment, when the sample parity is odd the bits delivered from device 19 in order to be associated with the concerned sample is inverted while the bits from device 19 are directly transmitted when the sample parity is even.

The produced modulated bit is transmitted to the input of speech memory 6 in order to be stored with the associated sample.

It must be understood that switching network speech memories, connections and cross points are so designed as to permit simultaneous transmission of $v + 1$ bits if $v$ is the number of sample bits.

At the switching network output, test system 2 comprises an arrangement associated with each switch for insuring reading of each sample and associated modulated bit and for that purpose in the described embodiment, and particularly the arrangement associated with output switch 5, the output of speech memory 14 in output time-division switch 5 is so separated as to provide separation of the $v + 1$ bits occurring at each elementary time. The v received sample bits are transmitted on the one hand, to out circuit 16 in order to be transmitted, on the concerned output time-division channel and, on the other hand, to a parity generator 22 which determines the corresponding sample parity to demodulate in demodulator 23 the associated modulated bit, demodulator 23 being preferably constituted by an exclusive OR gate. The bits delivered from demodulator 23 is normally identical to the bits delivered from addressing device 19 when the switching network has correctly operated and the circuits belonging to the test system have correctly operated.

According to this invention test system 2 comprises an origin memory which is associated to each output time-division switch such as origin memory 24 associated with switch 5.

First origin memory 24 can temporarily store addresses of input time-division channels which deliver samples to output time-division channels in switch 5. In the described embodiment, computer unit 11 provided for controlling the switching network, delivers at each communication establishment the addresses of the concerned input and output time-division channel which thus permits to store, for the direction of communication transmitted through switch 5 and for the duration of that communication, the address of the concerned input time-division channel and the row of memory 24 assigned to the output time-division channel of switch 5 which that input time-division channel must be connected to. Memory 24 is controlled and loaded in write operation by computer unit 11 and controlled in read operation by clock 10 so as to be synchronous with speech memory 14.

At each elementary time, demodulator 23 and origin memory 24 respectively provide the bit produced by demodulating the bit associated with a sample occurring from output of each memory 14 and the address of the input time-division channel which probably has transmitted the sample. Therefore, it is sufficient to compare, at each elementary time, the origin bit delivered from demodulator 23 with the corresponding bit extracted from the address delivered from memory 24 which needs simultaneous availability of those bits.

However, a sample may be delayed inside the switching network. Therefore, delays must be taken into account for making the test possible. Those delays may be caused either by time-division switching or space-division switching.

Indeed in a TST network sample transmission through the intermediate space-division switch 4 takes longer than one elementary time and needs a sequence of staggered operations through a plurality of stages. Therefore, the time duration of the transmission through switch 4 must be taken into account. However, this results in no particular difficulties because that transmission time is usually entirely determined.

Likewise if, in a speech memory, a sample has a read time earlier than its write time within the frame of its occurrence, it can only be read during the frame following the frame of its occurrence, and it is delayed by one frame, but by a maximum of one frame so as to not be lost.

In output time-division switches and more precisely in speech memories thereof, the so-called "output" delay that they possibly introduce is known to computer unit 11 since their respective addressings are only depending on computer unit 11 and switching network clock 10. Moreover, such a delay is identical for the entire duration of a given communication.

On the contrary, the so-called "input" delay, introduced by an input time-division switch, is depending on phase corrections made by updating circuit 9 in switch 3 for compensating imperfect synchronization of the switching network with respect to the network delivering input samples. The necessary corrections are made during certain selected frames, for instance, during frames $N° 1$ and $N° 2$ of each superframe containing all the time-division channels, these two frames not being utilized for transmitting samples concerning communications.

Input delay caused by an input switch varies randomly during a communication either being null or equal to a frame duration in view of the previously mentioned reasons.

Therefore, with delay possibly caused by the intermediate space-division stage 4 in a TST network not being taken into account, the maximum delay is of two frame durations, a frame duration delay being caused by each time-division switch, and the minimum delay is null. Thus, two bits are sufficient to determine the three possible conditions: no delay, one frame delay and two-frame delay, provided that the delaying stage is known in the case of one-frame delay.

According to this invention, two so-called determination bits are successively sent by every time-division channel during the first two frames of every superframe for being compared with corresponding bits stored in corresponding additional cells of memories 24 by means of an arrangement of suitable circuits.

In the case of switch 5, the two determination bits are delivered to addressing device 19 from its wired logic circuitry 28, these two bits always being identical. For instance, they form a binary combination 10 wherein binary 1 is always sent during the first frame (or frame $N° 0$) and binary 0 is always sent during the second frame (or frame $N° 1$). Therefore, device 19 will deliver a bit 1 at each elementary time of frames $N° 0$, a bit 0 at each elementary time of frame $N° 1$, the first bit of the address of the concerned input time-division channel at each elementary time of frame $N° 2$, ..., the last bit of the address of the concerned input time-division channel during each elementary time of frame $m + 1$, the number of the frames in a superframe being preferably selected as equal to the number of bits to be transmitted, i.e. $m + 2$ in the described example.

Thus, determination bits are transmitted from addressing devices 19 through the switching network in the same manner as origin bits and are also collected from the outputs of demodulator 23.

Those bits which must be compared with determination bits are stored in memories 24 provided with two additional columns for that purpose.

Figure 2A:
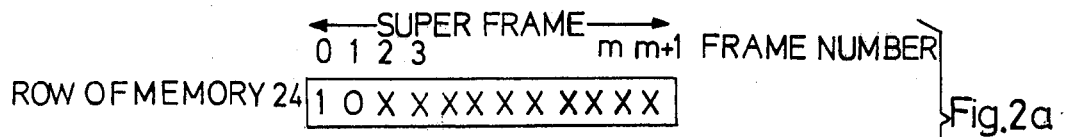
FIGS. 2a, 2b, 3a, 3b, 3c and 3d show message formats.
Figure 2B:
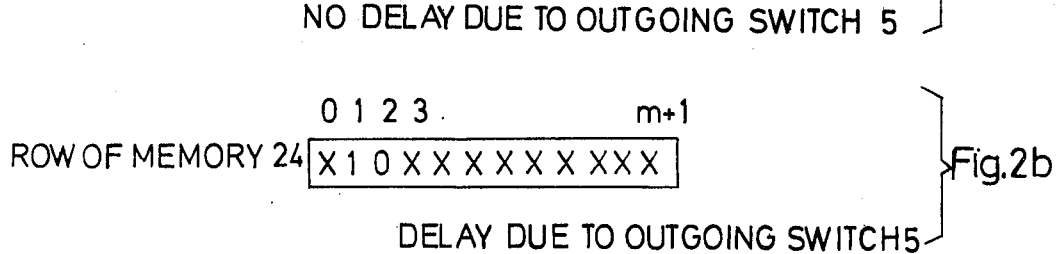

Considering that output delay of samples to be transmitted on an output channel is fixed and known to computer unit 11, such an output delay may be taken into account in writing comparison bits into memory 24. Computer unit 11 respectively writes bits 1 and 0 in the first cell and the second cell of any row in memory 24 when output delay zero is foreseen for samples to be received through the output time-division channel which that memory row is assigned to, considering the these two first cells respectively contain the two bits provided during the first two frames ($N° 0$ and $N° 1$) in superframes (FIG. 2a) when there is no input delay. Likewise bits 1 and 0 are respectively written by computer unit 11 into the second cell and the third cell of any row in memory 24 when output delay is foreseen for samples to be received from the output time-division channel which that row of memory 24 is assigned to, considering that second cell and third cell respectively contain the two bits provided during the second and third frames ($N° 1$ and $N° 2$) in superframes when there is no input delay (FIG. 2b).

Since demodulator 23 delivers only one bit per elementary time and memory 24 delivers $m + 2$ bits per elementary time, a multiplexer 26 having $m + 2$ data inputs is connected from outputs of memory 24 to make it possible to select the concerned bit among the $m + 2$ bits simultaneously delivered during a given elementary time.

Each data input of multiplexer 26 is connected from the output having the same rank in memory 24. Addressing of multiplexers 26 is provided from clock 10, via signal $h3$, each data input being operative for the duration of a frame. Thus, data input connected from column 0 of memory 24 is operative during frame $N° 0$ and sequentially delivers at each elementary time in that frame one of the bits stored in column 0.

For comparing bits delivered from demodulator 23 with bits delivered from memory 24, in every case without no input delay, the output of demodulator 23 and inverted output of corresponding multiplexer 26 are connected to inputs of EXCLUSIVE OR gate 29. Thus, EXCLUSIVE OR gate 29 delivers an output 1 when the bit delivered from demodulator 23 and the bit delivered from inverted output of multiplexer 26 are different.

When there is input delay, computer unit 11 does not know that delay and it is therefore not possible to take it into account in the write operation of memory 24 particularly because such an input delay may vary in the course of a communication, input delay having only two possible values 0 or 1.

Consequently multiplexer 27 is associated with memory 24 and data inputs of multiplexer 27 are connected from outputs of memory 24 which have the next higher rank, output 0 of memory 24 being connected to input 1 of multiplexer 27 and so on. Multiplexer 27 is controlled in the same manner as multiplexer 26. Thus, at each elementary time, multiplexer 27 delivers the bit which has been delivered at the preceding frame from multiplexer 26 for the corresponding elementary time.

Thus, in case of input delay and whatever the output delay is, multiplexer 27 delivers in inverted form the bit to be compared with the bit received from demodulator 23.

The comparison is carried out by means of an EXCLUSIVE OR gate 30 having one input connected from inverted output of multiplexer 27 and the other input connected from output of demodulator 23.

Since sample input delay and thus associated bit delay may vary from one frame to another, the input delay condition must be determined.

For that purpose control system 2 comprises a delay determination device and delay memory associated to each output time-division switch.

Figure 3A:
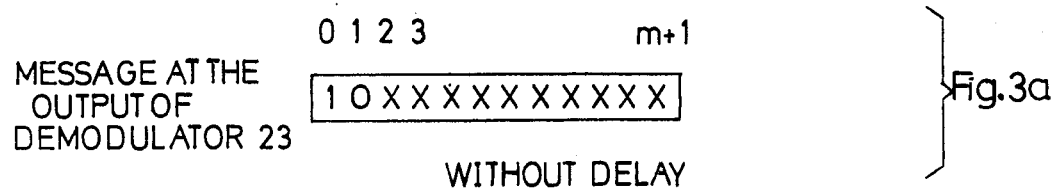
Figure 3B:
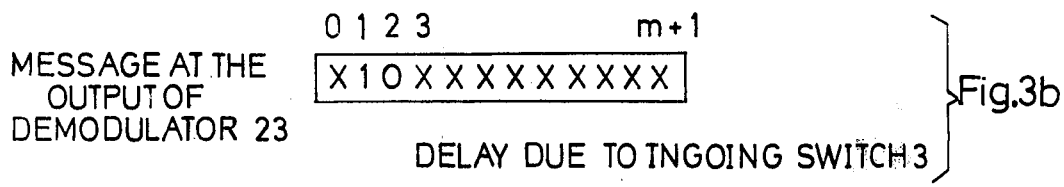
Figure 3C:
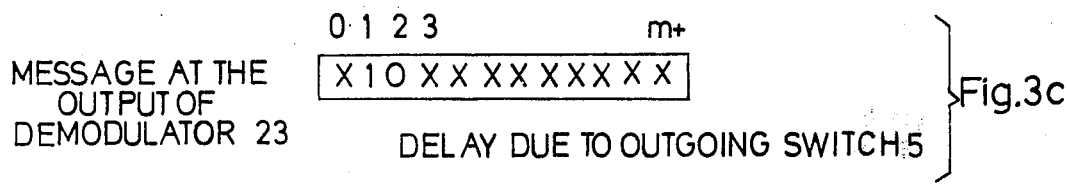
Figure 3D:
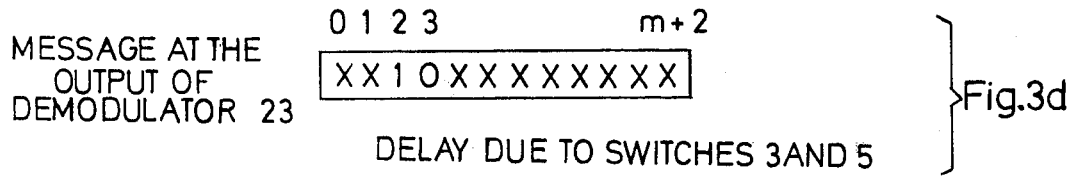

In the presently described switch 5, data 1 which is sent from input time-division switch addressing devices to demodulator 23, during frame $N° 0$, may occur during frames $N° 0$, $N° 1$ or $N° 2$ from output of demodulator 23. Likewise, data 0 sent at different elementary times of frame N° 1 may occur during frames N° 1, N° 2 or N° 3 (FIGS. 3a – 3d). As a result any bit 0 received in demodulator 23 during frame N° 1 corresponds to a bit transmitted without delay or a bit transmitted after having been delayed at the input as well as the output (FIGS. 3a and 3d). Similarly any bit 1 received in demodulator 23 during frame N° 1 corresponds to a delayed bit (FIGS. 3b, 3c, 3d).

Any bit 0 received in demodulator 23 during frame N° 2 corresponds to a bit transmitted either without delay (FIG. 3a) or to a bit delayed either at the input or at the output (FIGS. 3b, 3c). Any bit 1 received in demodulator 23 during frame N° 2 corresponds either to a bit transmitted without delay (FIG. 3a) or to a bit delayed both at input and output (FIG. 3d). The delay determination device associated with each switch and particularly the delay determination device associated with switch 5 are, therefore, each basically an assembly of logic gates permitting to make known the existance of an input delay in the different possible cases, each being associated with a utilization device whose purpose will hereafter be described. The delay determination device associated with switch 5 comprises an inverter 32 and NAND gates 33, 34 and 35.

Gates 33 and 34 have identical functions. Clock 10 applies a signal of value 1 to one input of gate 33 during frame N° 1 and to one input of gate 34 during frame N° 2. Both gates 33 and 34 also have another common input connected from output of demodulator 23. The third input of both gates 33 and 34 is connected to the output of column 1 of memory 24 associated with switch 5 through inverter 32. Consequently, the output of gate 33 and 34 are normally in the 1 condition unless the inputs of one of the two gates are all in the 1 condition. The two gates 33 and 34 in the same device have their outputs respectively connected to an input of a NAND gate 35 which is, thus, normally in condition 0 which corresponds to no delay.

Gate 33 delivers an input signal of value 0 only during frame N° 1 and when during an elementary time, on the one hand, the bit delivered from demodulator 23 has the value 1 and, on the other hand, the bit delivered from the output of column 1 of memory 24 has the value 0, i.e. when the case shown in FIG. 3b occurs since no output delay is indicated by memory 24 which excludes the cases of FIGS. 3c and 3d and the delay which can only be an input delay is indicated by the occurrence of a bit 1 from the output of demodulator 23 which excludes the case shown in FIG. 3a. Since gate 34 cannot normally deliver an output signal of value 0 at the same time as gate 33, gate 35, thus, delivers an output signal of value 1 which characterizes an input delay for the received bit and corresponding sample.

Output signal from gate 35 is applied to data input of delay memory 31 assigned to switch 5. Delay memory 31 has as many rows, each comprising one cell, as elementary times in a frame. Each row has the same address as one of the output time-division channels in switch 5. Addressing of memory 31 is provided by clock 10 and is controlled in write operation by the inhibiting device assigned to switch 5 so as to authorize writing into memory 31 only during either current frame N° 1 or N° 2. The inhibiting device includes NAND gates 41, 42, 43 and 51 and inverter 52.

Either signal 1 or 0 delivered from gate 35 is thus written into the row of memory 31 which corresponds to the output time-division channel of which the sample has been transmitted with the determination bit involved in production of either signal 1 or 0 from the concerned gate 35.

Gate 34 only delivers an output signal of value 0 during frame N° 2 when for the same elementary time, on the one hand, the bit delivered from demodulator 23 is a bit 1 and, on the other hand, the bit delivered from the output of column 1 of memory 24 is a bit 1. That is when the case shown in FIG. 3d occurs, since an output delay is indicated by memory 24 which excludes the case shown in FIG. 3a and an additional delay is indicated by occurrence of bit 1 from the output of demodulator 23 which excludes cases shown in FIGS. 3b and 3c. For the same reason as previously mentioned, gate 33 cannot deliver a signal of value 0 at the same time as gate 34. Therefore, gate 35 then delivers a signal of value 1 which is written into the row of memory 31 which corresponds to the concerned output time-division channel.

At the end of frame N° 2, delay memory 31, thus, contains either information 0 or 1 according to the input delay for each output time-division channel in switch 5 for the duration of the superframe containing the frame N° 2. As a result, it is possible to select the bit to be compared with an origin bit from demodulator 23 and more precisely it is possible to take into account the output signal from the concerned EXCLUSIVE OR gate 29 or 30.

The output of delay memory 31 is connected to one input of the two NAND gates 37 and 38, an inverter 39 being connected between output of delay memory 31 and gate 37. The other input of gate 37 is connected from the output of gate 29 while the other input of gate 38 is connected from the output of gate 30.

A three-input AND gate 40 has its first input connected from the output of gate 37, its second input connected from the output of gate 38 and its third input connected from output of inhibiting device AND gate 43.

For each output time-division channel in switch 5, the output of memory 31 delivers a bit 0 or 1 depending on the fact that either there is no input delay or there is input delay for samples transmitted through the concerned channel.

Bit 0 makes it possible to transmit through gate 37 a possible fault indicated by gate 29, such a fault resulting in a level 0 from the output of gate 29 and a level 1 from the output of gate 37. Bit 1 makes it possible to transmit through gate 38 a possible fault indicated by gate 30, such a fault resulting in a level 0 from the output of gate 30 and level 1 from the output of gate 38.

In a no faulty operation, both gates 37 and 38 do not have the same output signals and, therefore, AND gate 40 delivers a signal of value 0. On the contrary, a fault signal of value 1 is delivered from gate 40 in every other case save during frames N° 1 and N° 2 utilized for possible phase corrections.

A fault memory 44 permits the storing of faults as they occur in as many memory rows as output time-division channels in switch 5 which that memory 44 is assigned to. Therefore, memory 44 is connected to the output of gate 40 from which it receives information at each elementary time. Memory 44 is controlled in both read and write operations by network clock 10. NAND gate 45 prevents fault writing during frames N° 1 and N° 2.

In the described embodiment, each row of memory 44 has only one cell. Therefore, the output of memory 44 is connected back to its input via a NAND gate 46 through gate 45 so as to avoid erasing of a fault which has been stored during a given frame for a given output time-division channel by a correct indication occurring during one of the next frames in the same superframe. Frames N° 1 and N° 2 make it possible to reset memory 44 via a connection from output of inhibition device gate 43 to the input of gate 45.

In addition the output of gate 43 controls, via an inverter 49, the output of any fault information from memory 44 by means of a three-input AND gate 47 provided for inhibiting any fault indication for every elementary time of frames N° 1 and N° 2 of every superframe. The first input of gate 47 is connected from the output of memory 44, the second input is connected from gate 43 via inverter 49 and the third input is connected from the output of a three-input NAND gate 50. The output of gate 47 is connected to a fault register 48. Inputs of gate 50 are respectively connected from the outputs of columns 0, 1 and 2 of memory 24 corresponding to frames N° 0, N° 1 and N° 2, assuming that computer unit 11 writes information of value 1 into the three cells 0, 1 and 2 of a row when the corresponding output time-division channel is not utilized.

After having hereabove described the fault detection system, according to this invention, its function may be defined in various fault conditions.

In case of faulty transmission through the switching network, such a fault is detected by means of the parity generators respectively provided at both network input and output. Indeed when a sample is changed in the course of its transmission through the switching network, the partial origin data transmitted together with it will be demodulated according to sample parity produced by the output parity generator, such as generator 22, and parity delivered from generator 22 will normally be different than the parity delivered from the input parity generator, such as generator 20, with the result that the demodulated bit from demodulator 23 will be different than the bit stored in memory 24 which causes a fault to be written into memory 44. If parities were identical, the fault will be detected at the occurrence of one of the next samples transmitted through the same path since samples sequentially transmitted through the same channel are generally not identical.

In case of faulty connection, i.e. when samples to be sent to a given output channel are transmitted to another output channel, the input channel address bits stored in an origin memory, such as memory 24, for the concerned output channel will be at least partially different than the partial origin bits associated with samples received in the concerned output channel. Any difference between a stored bit and the corresponding transmitted bit will result in a fault signal, the first fault signal being stored in memory 44 so as to indicate the fault. It must be understood that, in that case, well known processes and devices, out of the scope of this invention, permit the location of the fault origin.

In case of multiple connections, they will be detected in processing origin data, as previously mentioned, or possibly parity-origin data combinations if several communications are mixed.

While I have described above the principles of my invention in connection with specific apparatus it is to be clearly understood that this description is made only by way of example and not as a limitation to the scope of my invention as set forth in the objects thereof and in the accompanying claims.

I claim:

1. A fault detection process for detecting faults occurring in a time-division switching network comprising the steps of
   inserting partial origin coded data into said switching network together with coded samples from an input time-division channel so that the address of said input time-division channel can be determined from said partial origin coded data;
   storing the address of said time-division channel connected to an output time-division channel for the duration of a communication; and
   comparing the address of said input time-division channel produced from said partial origin coded data received from an output of said switching network together with associated ones of said coded samples transmitted to said output time-division channel with said stored address related to said input time-division channel connected to said output time-division channel to signal a fault upon the occurrence of any difference between said produced address and said stored address.

2. A fault detection process according to claim 1, wherein
   said partial origin coded data associated with said code samples is produced by the step of
   modulating a selected one of the address bits of the address of said input time-division channel delivering said coded sample by the parity of said coded sample before inserting said partial origin coded data into said switching network; and said produced address is produced by the step of
   demodulating said partial origin coded data associated with said coded samples according to the parity of said coded samples delivered from said output of said switching network.

3. A fault detection system for a time-division switching network comprising:
   first means for producing a partial origin coded data associated with each coded sample delivered by various input time-division channels of said switching network;
   second means coupled to said first means to insert into said switching network said partial origin coded data together with its associated one of said coded samples;
   a switching network output coupled to said second means, said network output having various output time-division channels;
   third means coupled to said network output for separating said partial origin coded data from its associated one of said coded samples;
   fourth means coupled to said third means to determine bit by bit the address of that one of said input time-division channels delivering said coded sample received in one of said output time-division channels from said partial origin coded data associated with said coded sample received in said one of said output time-division channels;
   a switching network control computer unit;
   memory means coupled to said computer unit to store the address of said one of said input time-division channels as supplied by said computer unit;
   fifth means coupled to said memory means and said fourth means to determine transmission delays in said switching network affecting said coded sample and its associated one of said partial origin coded data in said one of said output time-division channels;

sixth means coupled to said fifth means and said memory means to select a stored address bit as a function of said delays;

seventh means coupled to said memory means and said fourth means to compare a bit of said received partial origin coded data with said selected stored address bit; and fault signalling means coupled to said computer unit and said seventh means responsive to differences detected by said comparison so as to inform said computer unit accordingly.

4. A fault detection system according to claim 3, wherein said fifth means includes at least a selected one of eighth means coupled to said computer unit, said memory means and said fourth means to detect transmission delay introduced by a space-division switch of said switching network through which, for the duration of a communication, said coded samples and their associated ones of said partial origin coded data are transmitted, said eighth means being controlled by said computer unit, ninth means coupled to said computer unit, said memory means and said fourth means to detect transmission delay introduced by an output time-division switch of said switching network through which, for the duration of a communication, said coded samples and their associated ones of said partial origin coded data are transmitted, said ninth means being controlled by said computer unit; and tenth means coupled to a network control unit, said memory means and said fourth means to detect random transmission delays introduced in successive superframes by an input time-division switch of said switching network through which said coded samples and their associated partial origin coded data are transmitted to an output time-division channel, said tenth means being operated at the beginning of every superframe by said control unit and stores the value of the current delay of said coded samples and their associated partial origin coded data received in said output time-division channel.

5. A fault detection system according to claim 3, wherein said first means are equal in number to a plurality of input time-division switches of said switching network, each of said first means being coupled to a different one of said input time-division switches and including an addressing device capable of delivering bit by bit the bits of the addresses of input time-division channels of an associated one of said input time-division switches, said device being coupled to a wired logic circuitry capable of delivering bits common to the addresses of input time-division channels of all said input time-division switches and an updating circuit in the associated one of said input time-division switches which is capable of delivering bits of the addresses of input time-division channels of the associated one of said input time-division switches, a first parity generator coupled to an input circuit of the associated one of said input time-division switches to determine and generate the parity for each of said coded samples delivered from said input circuit, and a modulator coupled to said second means, said addressing device, said first parity generator and the associated one of said input time-division switches to modulate an address bit delivered by said addressing device by the parity of the associated one of said coded samples generated by said first parity generator, said modulated address bit being inserted by said second means into the associated one of said input time-division switches as said partial origin coded data in association with the associated one of said code samples from which the parity was determined by said first parity generator.

6. A fault detection system according to claim 5, wherein said fourth means are equal in number to a plurality of output time-division switches of said switching network, each of said fourth means being coupled to a different one of said output time-division switches and including a second generator coupled to a speech memory of the associated one of said output time-division switches to produce the parity of any coded sample delivered from said speech memory, and a demodulator connected to said second parity generator and said speech memory, said demodulator receiving said modulated address bit from said speech memory and the parity of that one of said coded samples associated with said modulated address bit to demodulate the address bit corresponding to that one of said input time division channels that transmitted said one of said coded samples.

7. A fault detection system according to claim 6, wherein said memory means includes an origin memory for each of said output time-division switches, each of said origin memory being coupled to said computer unit and being capable of storing, for each output time-division channel of an associated one of said output time-division switches, input time-division channel addresses possibly connected to each of said output time-division channels for the duration of a communication, each input channel address being provided by said computer unit, said origin memory being addressed in read operation by a network clock to deliver the address of an input time-division channel connected to an output time-division channel once per frame, and a first multiplexer for each of said output time-division switches, each of said first multiplexer having its data inputs connected to the outputs of an associated one of said origin memories for producing a different bit for each frame of an input channel address from said associated one of said origin memories.

8. A fault detection system according to claim 7, wherein said transmission delays are integer multiples of a frame duration, and said eighth and ninth means are coupled to said associated one of said origin memories to control the position that each input time-division channel address is stored in an output channel memory row as a function of fixed delays affecting said coded sample and its associated modulated address bit received by the involved output channel to compensate said fixed delays affecting said modulated address bit by an equivalent delay for a corresponding stored bit delivered by said first multiplexer.

9. A fault detection system according to claim 8, wherein said tenth means includes eleventh means coupled to each of said addressing devices to insert into said switching network a constantly identical first bit at each elementary time of a first frame in each superframe and its reciprocal bit at each elementary time of a second frame in each superframe, each of said origin memories have two additional origin memory columns for storing said first and second bits in the origin memory row corresponding to said input time-division channel address taking into account information provided by said eighth and ninth means, first logic circuitry for each of said output time-division switches coupled to the associated one of said demodulators, the associated one of said origin memories and said network clock to determine whether or not there is a random delay affecting the associated one of said coded samples and its associated one of said modulated address bits received in an associated one of said output time-division channels for a specific frame, and a random delay memory coupled to said first logic circuitry for each of said output time-division switches for storing for a superframe duration information indicating whether or not there is a random delay in each of said output time-division channel and for providing said information during an elementary time of each frame when an associated one of said modulated address bit is received in an associated one of said output time-division channels.

10. A fault detection system according to claim 9, further including a second multiplex for each of said output time-division switches;

said second multiplexer being coupled to an associated one of said origin memories in such a manner that said second multiplexer will deliver at each elementary time the bit delivered from an associated one of said first multiplexer coupled to said associated one of said origin memories for the elementary time having the same rank but in the preceding frame.

11. A fault detection system according to claim 10, wherein said seventh means includes two comparators for each of said output time-division switches, each of said comparators having two inputs, each of said comparators having one input coupled to an associated one of said demodulators, one of said comparators having its other input coupled to an associated one of said first multiplexers and the other of said comparators having its other input coupled to an associated one of said second multiplexers, and second logic circuitry for each of said output time-division switches coupled to the output of an associated one of said two comparators and an associated one of said random delay memories to deliver a fault condition information provided by one of said two comparators when there is no random delay and provided by the other of said two comparators when there is random delay.

* * * * *